(12) United States Patent
Charters et al.

(10) Patent No.: US 9,858,059 B2
(45) Date of Patent: Jan. 2, 2018

(54) SYSTEM MODULE DEPLOYMENT OPTIMIZATION

(71) Applicant: INTERNATIONAL BUSINESS MACHINES CORPORATION, Armonk, NY (US)

(72) Inventors: Graham C. Charters, Hursley (GB); Lewis Evans, Hursley (GB); Timothy J. Mitchell, Hursley (GB); Adam J. Pilkington, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/852,674

(22) Filed: Sep. 14, 2015

(65) Prior Publication Data

US 2017/0075669 A1    Mar. 16, 2017

(51) Int. Cl.
G06F 9/445    (2006.01)

(52) U.S. Cl.
CPC ............ G06F 8/60 (2013.01); G06F 9/44505 (2013.01)

(58) Field of Classification Search
CPC ..... G06F 8/60; G06F 8/61; G06F 8/70; H04L 45/563
See application file for complete search history.

(56) References Cited

U.S. PATENT DOCUMENTS 7,870,546 B2    1/2011  Meduri et al.
7,979,748 B2 *  7/2011  Brady ................... G06F 11/366
                                                714/38.11

(Continued)

FOREIGN PATENT DOCUMENTS

CN    102929643 A    2/2013
CN    102141919 B    3/2013

OTHER PUBLICATIONS

Meedeniya, Indika, et al. "Reliability-driven deployment optimization for embedded systems." Journal of Systems and Software 84.5 (2011): 835-846. Retrieved on [Aug. 20, 2017] Retrieved from the Internet: URL<http://www.sciencedirect.com/science/article/pii/S0164121211000069>.*

(Continued)

*Primary Examiner* — Thuy Dao
*Assistant Examiner* — Cheneca Smith
(74) *Attorney, Agent, or Firm* — Stephen R. Yoder, Esq.; Kevin P. Radigan, Esq.; Heslin, Rothenberg, Farley & Mesiti

(57) ABSTRACT

Optimizing deployment of a modular application in a runtime environment is provided. The optimizing includes: deploying application modules of the modular application, each application module having a module manifest and at least one application module having parts for execution, one or more module manifests include one or more references to parts of another application module, and parts required for execution of the application, the deploying is according to the module manifest; executing the modular application; determining that at least one deployed application module has no parts executing in the runtime environment; and adapting the module manifest so that the determined at least one deployed application module will not be deployed as part of the modular application in future deployments.

10 Claims, 7 Drawing Sheets

(56) References Cited

U.S. PATENT DOCUMENTS

| | | | |
|---|---|---|---|
| 8,359,590 B2* | 1/2013 | Brannen, Jr. | G06F 8/61 |
| | | | 717/116 |
| 8,490,120 B2 | 7/2013 | Cable | |
| 8,566,559 B2 | 10/2013 | Schmich et al. | |
| 8,640,094 B2 | 1/2014 | Burckart et al. | |
| 8,869,140 B2* | 10/2014 | Todorova | G06F 8/61 |
| | | | 717/126 |
| 9,037,642 B2* | 5/2015 | Malik | H04W 4/001 |
| | | | 709/203 |
| 9,710,355 B2* | 7/2017 | Bartolomeo | G06F 11/3604 |
| 2008/0040455 A1* | 2/2008 | MacLeod | G06F 8/61 |
| | | | 709/220 |
| 2009/0282401 A1* | 11/2009 | Todorova | G06F 8/61 |
| | | | 717/175 |
| 2010/0192133 A1* | 7/2010 | Brady | G06F 11/366 |
| | | | 717/128 |
| 2012/0266158 A1* | 10/2012 | Spivak | G06F 9/5055 |
| | | | 717/175 |
| 2013/0054682 A1* | 2/2013 | Malik | H04W 4/001 |
| | | | 709/203 |
| 2013/0311628 A1* | 11/2013 | Kruglick | G06F 8/61 |
| | | | 709/223 |
| 2014/0013315 A1* | 1/2014 | Genevski | G06F 8/60 |
| | | | 717/170 |
| 2015/0186129 A1* | 7/2015 | Apte | G06F 9/44505 |
| | | | 717/174 |

OTHER PUBLICATIONS

Litoiu, Marin, et al. "A business driven cloud optimization architecture." Proceedings of the 2010 ACM Symposium on Applied Computing. ACM, 2010. Retrieved on [Aug. 20, 2017] Retrieved from the Internet: URL<http://dl.acm.org/citation.cfm?id=1774170>.*

Bailey et al., "Debugging From Dumps: Diagnose More than Memory Leaks with Memory Analyzer", IBM.com/developerWorks/, Mar. 15, 2011 (22 pages).

"mBProfiler—The Source Code Optimization Tool for Embedded Java Projects", http://www.prosyst.com/mbprofiler/mbprofiler/, downloaded Apr. 25, 2015 (2 pages).

* cited by examiner

Deployment Optimizer 200

Manifest Deployment Engine 202

Application Initiator 204

Heap Analyzer 206

Manifest Engine 208

Deployment Optimizer Method 300

FIGURE 2

Deployment Before Optimization

Deployment After Optimization

SYSTEM MODULE DEPLOYMENT OPTIMIZATION

BACKGROUND

The present invention relates to a method and system for application module deployment optimization. The present invention operates in the general environment of runtime optimization of modularized system.

Modularity enables a system to be defined in terms of a set of modules and for those modules to be independently modifiable without causing unexpected consequences. OSGi is a modularity technology for Java that can extend a Java jar with metadata that describes the jar as a software module, including information about the Java packages it provides or requires. The OSGi specification describes a modular system and a service platform for the Java programming language that implements a complete and dynamic component model, something that does not exist in standalone Java Runtime Environment (JRE) or other virtual machine environments. Java and all Java-based trademarks and logos are trademarks or registered trademarks of Oracle and/or its affiliates.

The packages that the module provides and requires are expressed in a Jar manifest declaratively which means that OSGi can help preserve information about a system's architecture and that static analysis tools can ensure a system is complete.

SUMMARY

In one aspect, provided herein is a system for optimizing deployment of a modular application in a runtime environment. The system includes a memory, and a processor in communications with the memory, wherein the system performs a method comprising: deploying application modules of the modular application, each application module having a module manifest and at least one application module having parts for execution, one or more module manifests comprising one or more references to parts of another application module, and parts required for execution of the application, the deploying being according to the module manifests; executing the modular application; and determining that at least one deployed application module has no parts executing in the runtime environment.

In another aspect, a method is provided for optimizing deployment of a modular application in a runtime environment. The method includes: deploying application modules of the modular application, each application module having a module manifest and at least one application module having parts for execution, one or more module manifests comprising one or more references to parts of another application module, and parts required for execution of the application, the deploying being according to the module manifests; executing the modular application; and determining that at least one deployed application module has no parts executing in the runtime environment.

In a further aspect, a computer program product is provided for optimizing deployment of a modular application in a runtime environment. The computer program product includes a computer-readable storage medium having program instructions embodied therewith, the program instructions being executable by a processor to cause the processor to perform a method, the method comprising: deploying application modules of the modular application, each application module having a module manifest and at least one application module having parts for execution, one or more modular manifests comprising one or more references to parts of another application module, and parts required for execution of the application, the deploying being according to the module manifest; executing the modular application; and determining that at least one deployed application module has no parts executing in the runtime environment.

BRIEF DESCRIPTION OF THE DRAWINGS

Certain embodiments of the present invention are described below, by way of example only, with reference to the following drawings in which:

FIG. 2 depicts one embodiment of a component diagram, in accordance with one or more aspects of the present invention;

DETAILED DESCRIPTION

Figure 1:
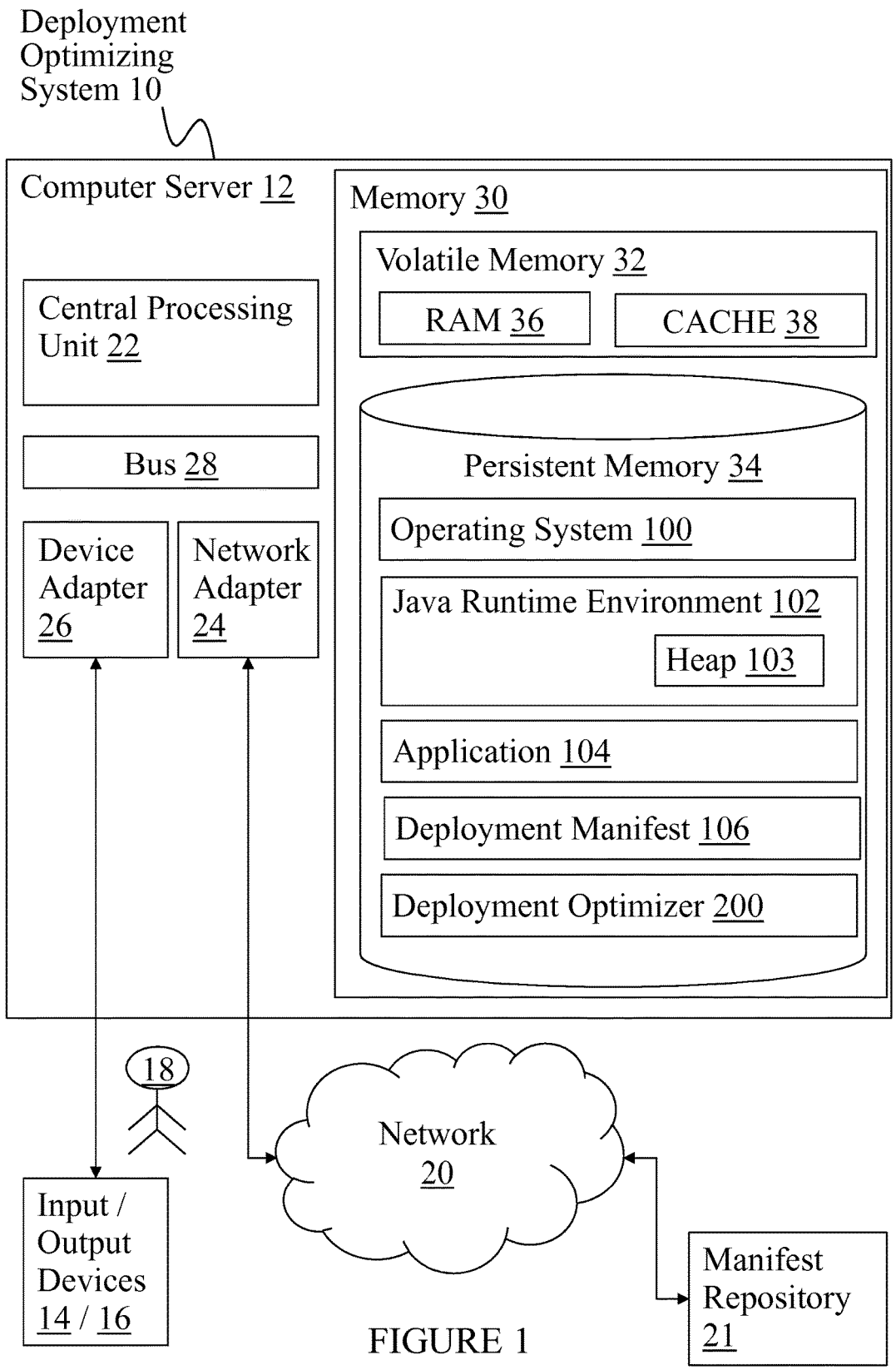
FIG. 1 is one embodiment of a deployment diagram, in accordance with one or more aspects of the present invention.

Referring to FIG. 1, in one embodiment, a deployment optimizing system 10 may be operational with numerous other general purpose or special purpose computing system environments or configurations. Examples of well-known computing processing systems, environments, and/or configurations that may be suitable for use with deployment optimizing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment may include a cloud computing environment, for example, where a computer processing system is a third party service performed by one or more of a plurality computer processing systems. A distributed computer environment also may include an Internet of things computing environment, for example, where computer processing systems are distributed as a network of objects that can interact with a computing service.

Deployment optimizing system 10 may be described in the general context of computer system executable instructions, such as program modules, being executed by a computer processor. Generally, program modules may include: routines; programs; objects; components; logic; and data structures that perform particular tasks or implement particular abstract data types. Deployment optimizing system 10 may be embodied in distributed cloud computing environments where tasks are performed by remote processing devices that are linked through a communications network.

In a distributed cloud computing environment, program modules may be located in both local and remote computer system storage media including memory storage devices.

In the depicted embodiment, deployment optimizing system 10 comprises: a general purpose computer server 12 and one or more input devices 14 and output devices 16 directly coupled to computer server 12. Deployment optimizing system 10 is shown connected via a network 20 to a manifest repository 21. Deployment optimizing system 10 communicates with a user 18 using input devices 14 may and output devices 16. Input devices 14 include one or more of: a keyboard; a scanner; and a mouse, trackball or another pointing device. Output devices 16 may include one or more of a display or a printer. Deployment optimizing system 10 communicates with network devices (not shown) over network 20.

By way of example, network 20 can be a local area network (LAN), a wide area network (WAN), or the Internet.

Manifest repository 21 is a remote server that stores, in one or more embodiments, deployment manifests for distributed clients. Module manifests for an application may be collected in such a manifest repository 21 and updated in situ. This allows a client to benefit from the optimized module manifest. Other artifacts such as overlay files can also be stored in manifest repository 21.

In the embodiment shown, computer server 12 comprises: central processing unit (CPU) 22; network adapter 24; device adapter 26; bus 28 and memory 30.

CPU 22 loads machine instructions from memory 30 and performs machine operations in response to the instructions. Such machine operations may include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 may include computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally, volatile memory may be used because it is faster and generally non-volatile memory may be used because it will hold data for longer. Deployment optimizing system 10 may further include other removable and/or non-removable, volatile and/or non-volatile computer system storage media. By way of example only, persistent memory 34 can be provided for reading from and writing to a non-removable, non-volatile magnetic media (not shown, and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of one or more embodiments of the present invention may comprise: operating system 100; java run time environment (JRE) 102; application 104; deployment manifest 106; and deployment optimizer 200. In one or more embodiments, ROM in memory 30 stores the modules that enable computer server 12 to function as a special purpose computer specific to deployment optimizer 200. Further program modules that support one or more embodiments, but which are not shown may include firmware, a boot strap program, and support applications. Each of the operating system; support applications; other program modules; and program data; or some combination thereof; may include an implementation of a networking environment.

Operating system 100 may comprise machine operating instructions for enabling the computer server 12 to perform basic operations of a computer system. In one embodiment, deployment system basic operations may be part of the operating system and in other embodiments, the deployment system basic operations may be an application layer that uses the operating system.

JRE 102 may comprise machine operating instructions for enabling an application to run on the computer server and operating system 100. JRE 102 comprises a runtime heap 103 (referred to as the heap in this description) for working memory during the execution of an application. Although the one or more embodiments discussed herein use the heap of a Java virtual machine, a heap of any virtual machine may be used. Moreover, it is envisaged that the concepts of the embodiments need not be limited to virtual machines, but could also be used on any processing machine that uses a heap to store working components of an application during execution.

Application 104 is a modularized application that runs on the JRE 102.

Deployment manifest 106 is a list of modules needed to execute application 104.

Deployment optimizer 200 may comprise the core functionality of one or more embodiments of the present invention.

Referring to FIG. 2, deployment optimizer 200 may comprise: a manifest deployment engine 202; an application initiator 204; a heap analyzer 206; a manifest engine 208;

and a deployment optimizer method 300. Each of components 202, 204, 206, 208 and 300 has a functional name and may be any type of component or sub-component for performing its respective function.

Manifest deployment engine 202 is for deploying the application according to at least two module manifests. Such a component can also be referred to as a module deployment engine.

Application initiator 204 is for initiating execution of the application.

Heap analyzer 206 is for determining that at least one deployed module has no parts executing in the runtime environment.

Manifest engine 208 is for adapting the module manifests whereby the determined at least one deployed module will not be deployed as part of the application in future deployments. Manifest engine 208 could be any engine for adapting the module manifests and alternatively be called a module description engine for adapting the module manifest.

Deployment optimizer method 300 is provided for performing the one or more aspects of the present invention using the components of deployment optimizer 200. Deployment optimizer method 300 may comprise deployment optimizer 300A (FIG. 3A) in one embodiment described below with respect to FIG. 3A. Alternatively, deployment optimizer method 300 could comprise a deployment optimizer 300B (FIG. 3B) in another embodiment described below with respect to FIG. 3B.

Figure 3A:
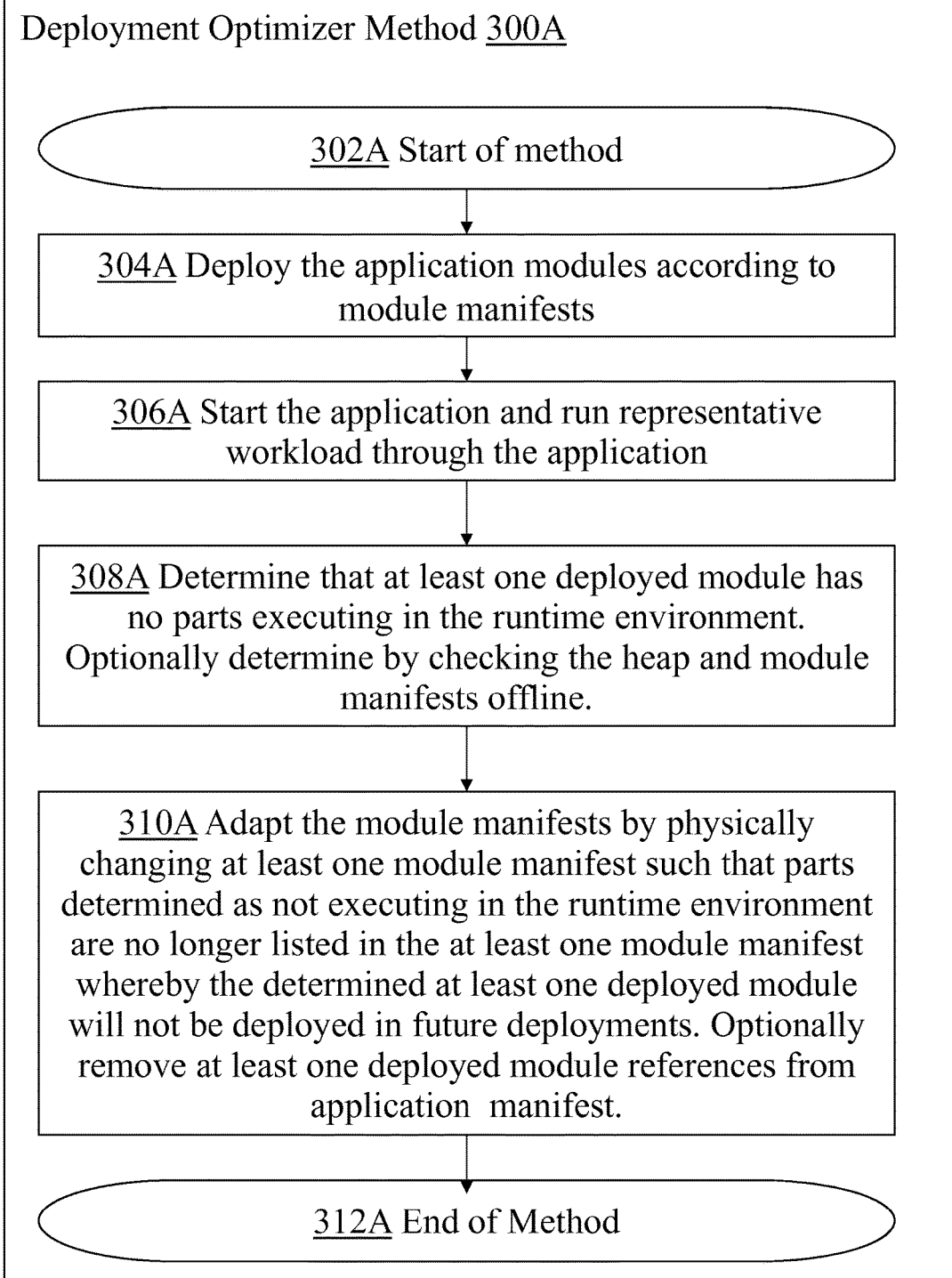
FIG. 3A is a flow diagram of one embodiment of a deployment optimization method, in accordance with one or more aspects of the present invention.

Referring to FIG. 3A, method 300A may comprise logical process steps 302A to 312A for optimizing deployment of a modular application in a runtime environment, where the modular application comprises two or more modules, each module having a module manifest and parts for execution, one or more module manifests comprising one or more references to parts of the other modules, and some parts optionally required for execution of the application.

Step 302A is a start of the method, that is, when initiated by a client or user to optimize deployment of an application.

Step 304A is provided for deploying the application modules according to the module manifests. In another embodiment, deployment modules are loaded into working memory according to a single deployment manifest 106 (FIG. 1) being the product of the combined module manifests.

Step 306A starts the application and runs a representative workload through the application. A representative workload may comprise data or a script that allows the application to execute in a representative or average way such that the heap is representative of an expected heap. Such data or scripts are dependent on the input requirements of the application and are designed to represent a typical workload. Optionally the process waits for the application to run for a set time or after some tests have been applied before moving on to the next step 308A. A typical heap can be achieved soon after an application is started or sometime after the start of the application. A test can examine the heap and can determine if the heap is still dynamic or has reached a stable state. Any test that defines a representative workload or heap and verifies that definition can be used. Parts are made available for loading into the heap but are only loaded when they are first used. In one or more aspects, embodiments of the present invention examine the content of the heap, and detect that the parts have been used if they have been loaded in the heap.

Step 308A determines that at least one deployed module has no parts executing in the runtime environment. This may be performed in one or more embodiments by checking the heap directly and determining which parts listed in the application module manifests are not loaded and if these parts constitute a whole module. Another embodiment may make a copy of the heap (a heap dump) and the module manifests to determine offline that at least one deployed module has no parts executing in the runtime environment.

Step 310A adapts the module manifests by physically changing at least one module manifest such that parts determined as not executing in the runtime environment are no longer listed in the at least one module manifest, wherein the determined at least one deployed module will not be deployed in the application for future deployments. Physically changing means removing such that part names are removed from the list in the module manifest. A part in one or more embodiments can mean other modules, packages of classes or individual classes. For example, referring to FIG. 5A module manifest 408D includes a list of packages required 410D and this whole list is removed from 408D* in FIG. 6A, for example, by removing or nullifying the code of module manifest 408D. In another example the list of packages required 410D could comprise package names: 410D1; 410D2; 410D3; 410D4, wherein 410D3 and 410D4 comprise a module that is not loaded into the representative heap. In this example, the package names 410D3 and 410D4 are removed (or replaced with null characters) leaving the reminder of the list intact.

Step 312A stops the application since the analysis is finished.

Figure 3B:
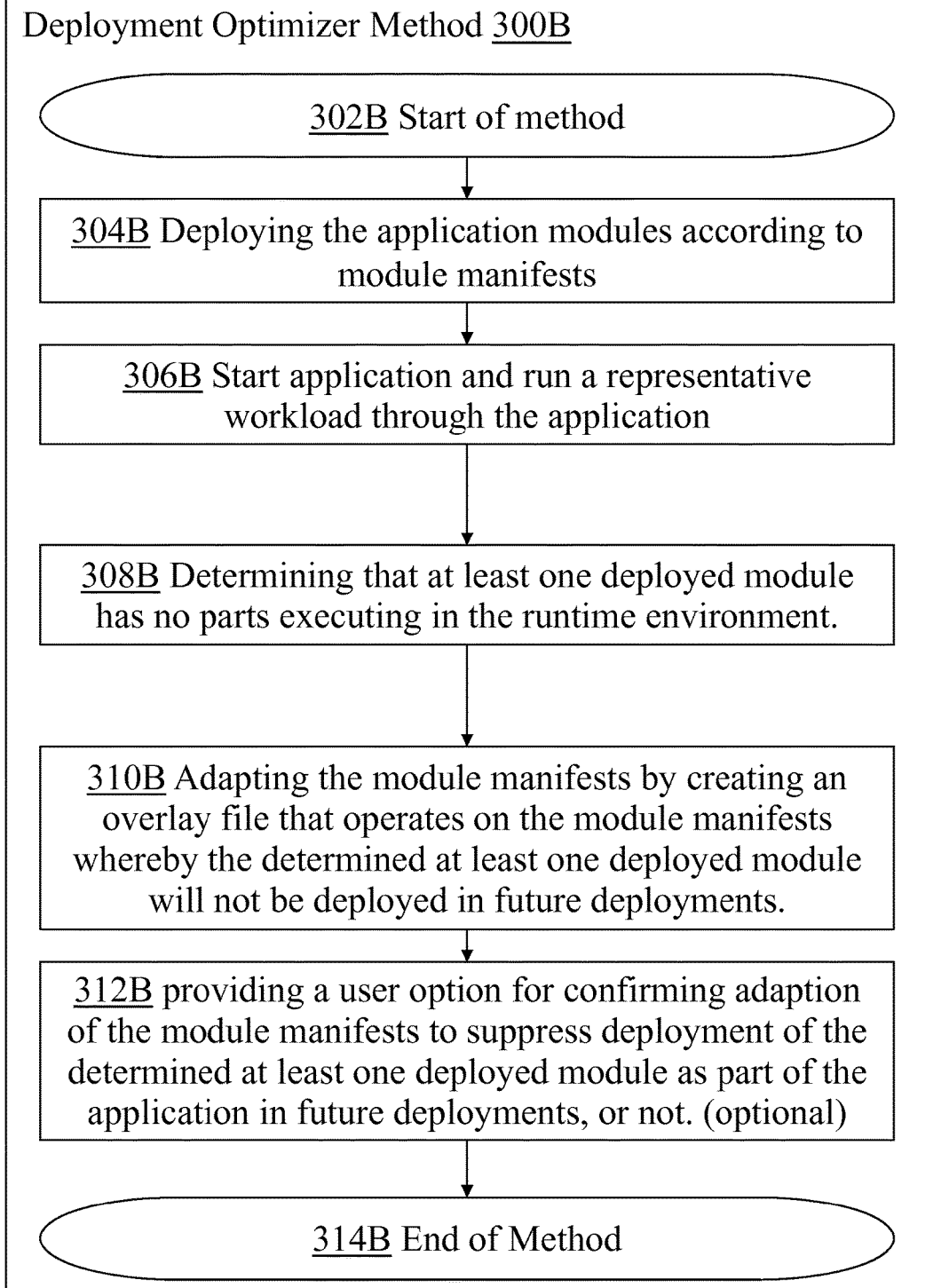
FIG. 3B is a flow diagram of another embodiment of a deployment optimization method, in accordance with one or more aspects of the present invention.

Referring to FIG. 3B, alternate method 300B may comprise logical process steps 302B to 314B. Although there is an order to the depicted steps, the steps need not necessarily be performed in this order unless specified, and in other embodiments steps can be in a different order.

Step 302B is start of the method when initiated by a client or user.

Step 304B deploys an application module set. Deployment is where listed modules are loaded into working memory according to deployment manifest 106 (FIG. 1) or a root module manifest. A deployment manifest may be a complete list of all required modules that is built from locating required modules from the parts list of a root module manifest and all dependent module manifests.

Step 306B starts the application and runs a representative workload through the application. Optionally, the step waits for the application to run for a set time or after some tests have been applied before moving on to next step 308B.

Step 308B determines that at least one deployed module has no executing parts. This may be performed by checking the heap and determining which parts from the application modules are not loaded and if these parts constitute a whole module or whole modules.

Figure 4:
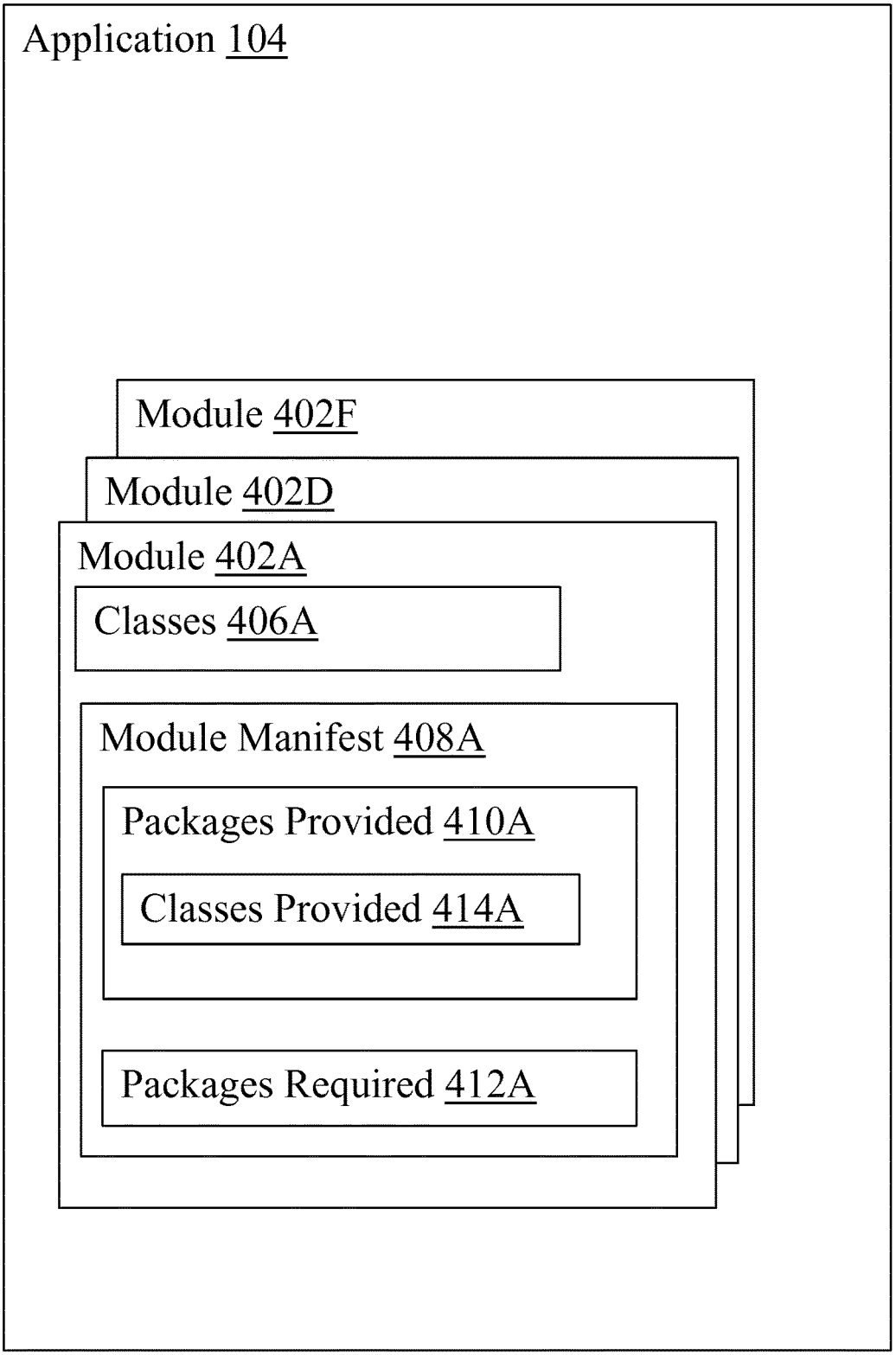
FIG. 4 depicts an exemplary modular application, and deployment module manifest, in accordance with one or more aspects of the present invention.

Step 310B adapts the module manifests by creating an overlay file that operates on the module manifests, wherein the determined at least one deployed module will not be deployed in future deployments. The overlay file effectively instructs the runtime environment to ignore or skip redundant modules. For example, an overlay file is referenced in a module manifest such that the manifest deployment engine will use the overlay file to deploy the required parts rather than simply deploy the listed required parts. In the example of FIG. 4, if the required packages of a module 408D are 410D1; 410D2; 410D3; 410D4, but an overlay file is created that only lists 410D1 and 401D2 for deployment and such an overlay file is associated with module 408D then only the module or modules for 401D1 and 410D2 are deployed (leaving 410D3 and 410D4 as not deployed).

Step 312B provides a user option for each of the at least one determined modules for confirming adaption of the module manifests to suppress deployment of the determined at least one deployed module as part of the application in future deployments. An option may also be provided for confirming no such adaption, so that the determined at least one deployed module is still deployed as part of the application in future deployments.

Step 314B stops the application since the analysis is finished.

Referring to FIG. 4, a simple example is depicted of a collection of modules 402A to 402N, which comprise: classes 406A to 406N and module manifest 408A to 408N, respectively. Packages do not physically contain items but define a thing or group of things by name. In this example, the packages define a class or a group of one or more classes. By way of examples, application 104 comprises: modules 402A, 402D and 402F. Module manifest 408A (and similarly for module manifest 408D and 408F (included in example but not shown)) may comprise a list of packages provided 410A (also 410D and 410F not shown) and a list of packages required 412A (also 412D and 412F not shown). Packages provided 410A (also 410D and 410F not shown) comprises, in this example, a list of classes provided 414A (also 414D and 414D not shown).

Figure 5A:
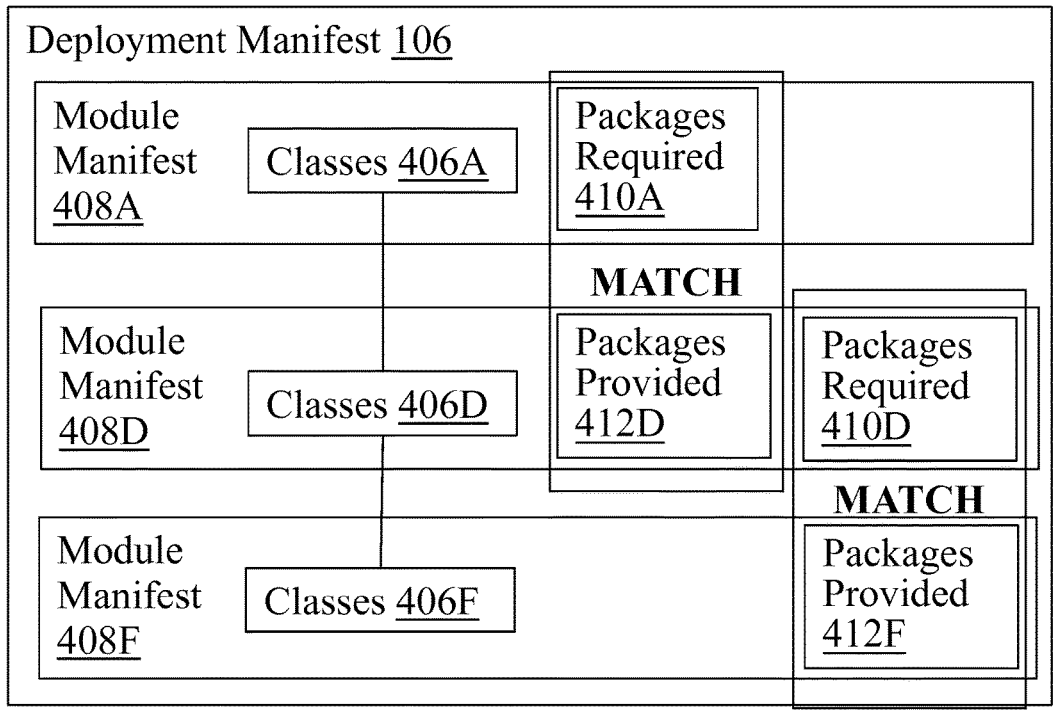
FIGS. 5A and 5B depict exemplary states of a modular application before optimization, in accordance with one or more aspects of the present invention.

Referring to FIG. 5A, an example state of a deployment manifest before optimization is described. Deployment manifest 106 comprises or references three module manifests 408A, 408D and 408F in FIG. 4, where module manifest 408A has 'Packages Required 410A' matching 'Packages Provided 412D' in module 402D. Module manifest 408D has 'Packages Required 410D' matching 'Packages Provided 412F' in module 402F.

Figure 5B:
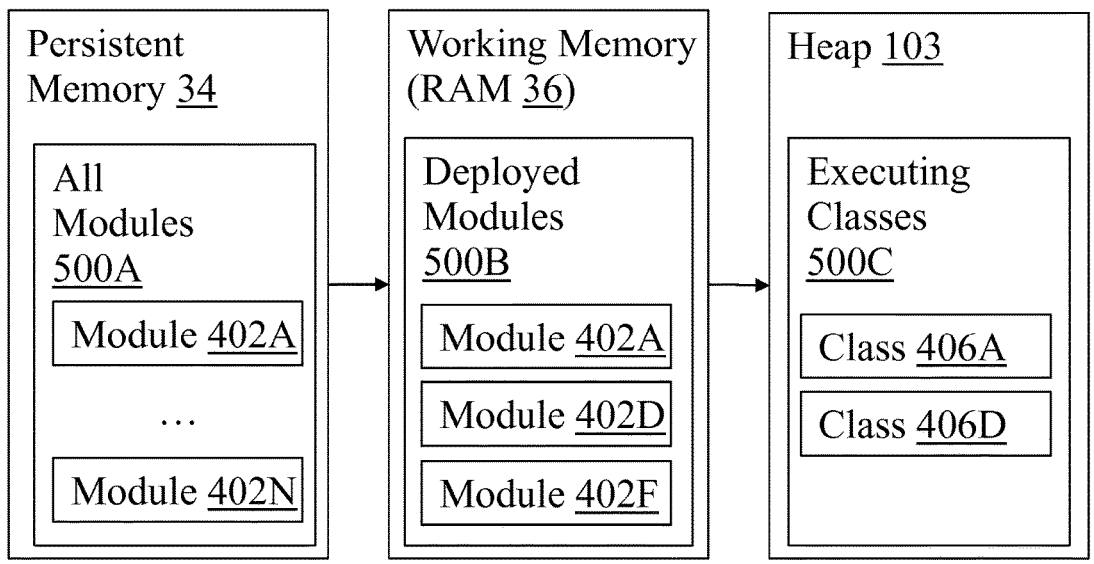

Referring to FIG. 5B, a corresponding state of system memory is described. On deployment of the application (step 304A) three modules 402A, 402D and 402F may be loaded from persistent memory 34 (comprising modules 402A to 402N) and are deployed in working memory (for example RAM 36). After execution of the application, and on waiting for a representative workload (step 306A), it is determined (step 308A) that only classes 406A and classes 406D are loaded in the heap 103 and that classes 406F are not in heap 103.

Classes 406A and 406D in heap 103 are analyzed and discovered to be part of packages 410A and 410D with respective modules 402A and 402D. But no classes are found (step 308A) in heap 103 that are part of module 402F (in particular classes 406F are not found). Module 402F is referenced in the module manifest 408D (in fact it is package 412F that is referenced) and this reference is removed (step 310A) to create module manifest 408D* and corresponding adjusted deployment manifest 106* (see FIG. 6A).

Figures 6A, 6B:
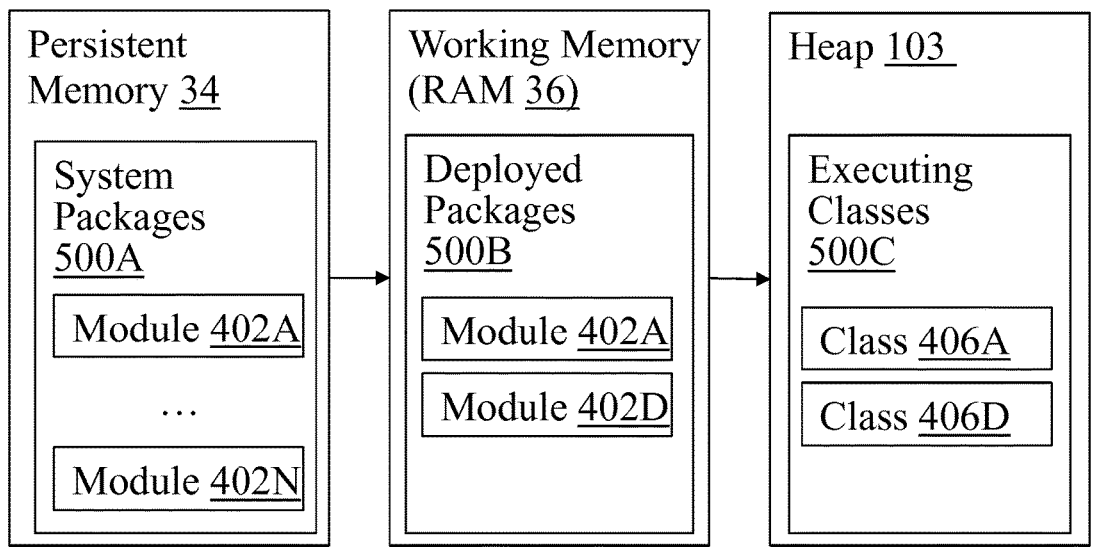
FIGS. 6A and 6B depict exemplary states of the modular application, after optimization, in accordance with one or more aspects of the present invention.

Referring to FIG. 6A, an example state of the deployment manifest 106* after optimization is depicted. Adjusted deployment manifest 106* is formed from module manifests 408A and 408D*, wherein module manifest 408F is no longer included.

Referring to FIG. 6B the corresponding state of the system memory is depicted. Application modules 402A and 402D are deployed in working memory. Therefore, on execution of the application, and on waiting for a representative workload, class 406A and class 406D are executing in heap 103 and no extra modules have been deployed in the working memory (by manifest deployment engine 202).

In summary, in one or more aspects, provided herein is a system for optimizing deployment of a modular application in a runtime environment, the modular application comprising two or more modules, each module having a module manifest and some modules having parts for execution, one or more module manifests comprising one or more references to parts of the other modules and wherein only some of the parts are required for execution of the application, the system comprising: a manifest deployment engine for deploying the application modules according to the module manifests; an application initiator for executing the application; and a heap analyzer for determining that at least one deployed module has no parts executing in the runtime environment. The system can be a standalone system or a plugin for a tool or integrated development environment.

There is also provided a method for optimizing deployment of a modular application in a runtime environment, the modular application comprising two or more modules, each module having a module manifest and some modules having parts for execution, one or more module manifests comprising one or more references to parts of the other modules and wherein only some of the parts are required for execution of the application, the method comprising: deploying the application modules according to the module manifests; executing the application; and determining that at least one deployed module has no parts executing in the runtime environment.

Suitably the method further comprises adapting the module manifests wherein the determined at least one deployed module will not be deployed as part of the application in future deployments.

The method may further comprise providing an indication of a characteristic of the determined at least one deployed module that would allow environment gains to be determined. The indication can be via a user interface to a user and would allow the user to prioritize not deploying one module over not deploying another module. The characteristic could be size of the module or some other indication of memory utilization. The characteristic could be an estimate of how much processor capacity would be needed in deploying the module.

A module manifest may comprise a list of parts provided by the respective module and a list of parts required by the respective module. A module manifest can be a module description or any description of a module. A part can be another module or modules (or bundle of modules), a package or packages of classes, and/or an individual class. Bundle here is not a specific OSGi bundle, but any collection of modules.

The runtime environment may comprise a heap and the method of determining that at least one deployed module that has no parts executing in the runtime environment may comprise determining that at least one deployed module that has no parts executing in the heap. One or more embodiments may wait until the application is operating on a representative workload and at that point, may analyze the heap to determine which bundles have had classes loaded by the runtime environment, thus indicating their use by the application. This may then be cross referenced against the manifests, and used to identify, recommend or provide action changes to the declared dependencies, for example, to remove redundant or unnecessary package dependencies.

Adapting the module manifests may comprise physically changing at least one module manifest such that parts determined as not executing in the runtime environment are no longer listed as required in the at least one module manifest. Module manifests are then altered such that when the application is subsequently deployed or restarted, time is no longer spent processing dependencies that are not required.

Alternatively, the determination of executing parts of a deployed module may be performed offline by analyzing a copy of the heap.

The module manifests for an application may be collected and updated in a remote repository. Thereby future installations on different servers will benefit from the optimizations. The method may comprise: executing multiple instances of the application and determining non-executing modules from analysis of multiple runtime environments. When running in an environment where multiple instances of the same application are running, then heap information from each instance can be sent to a central location, where the analysis on the combined heap information takes place.

Alternatively, changing the deployment manifest and/or at least one dependent module manifest may comprise creating an overlay file that operates on the module manifests, wherein the at least one determined module will not be deployed in future deployments. An overlay file could also comprise a new module manifest. The overlay file effectively instructs the runtime environment to ignore or skip redundant modules. An overlay file for an application can be collected and updated in a remote repository.

Alternatively, the method may further comprise providing a user option for each of the at least one determined modules for confirming adaption of the module manifests to suppress deployment of the determined at least one deployed module as part of the application in future deployments, or for confirming no such adaption so that the determined at least one deployed module is still deployed as part of the application in future deployments.

It will be clear to one of ordinary skill in the art from the description provided herein that all or part of the logical process steps of the embodiments shown may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the embodiments discussed may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the embodiments disclosed may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A method for optimizing deployment of a modular application in a runtime environment, the method comprising:
   deploying application modules of the modular application, each application module having a module manifest and at least one application module having parts for execution, one or more module manifests comprising one or more references to parts of another application module, and parts required for execution of the application, the deploying being according to the module manifest;
   executing the modular application in a runtime environment on a representative workload;
   based on the modular application operating on the representative workload, determining that at least one deployed application module has no parts executing in the runtime environment, the determining including checking a heap of the runtime environment to determine whether at least one deployed application module has no parts executing in the heap;
   based on determining that at least one deployed application module has no parts executing in the heap, adapting the module manifests so that the determined at least one deployed application module with no parts executing in the heap will not be deployed as part of the modular application in future deployments; and
   wherein adapting the module manifests comprises changing at least one module manifest such that parts determined as not executing in the runtime environment are no longer listed in the at least one module manifest.

2. The method of claim 1, wherein adapting the module manifests comprises creating an overlay file that operates on the module manifests so that the at least one determined module will not be deployed in future deployments.

3. The method of claim 1, wherein the module manifests for the modular application are collected and updated in a remote repository.

4. The method of claim 1, further comprising providing an indication of a characteristic of the determined at least one deployed application module that would allow environment gains to be determined.

5. A system for optimizing deployment of a modular application in a runtime environment, the system comprising:
   a memory; and
   a processor in communications with the memory, wherein the system performs a method comprising:
      deploying application modules of the modular application, each application module having a module manifest and at least one application module having parts for execution, one or more module manifests comprising one or more references to parts of another application module, and parts required for execution of the application, the deploying being according to the module manifest;
      executing the modular application in a runtime environment on a representative workload;
      based on the modular application operating on the representative workload, determining that at least one deployed application module has no parts executing in the runtime environment, the determining including checking a heap of the runtime environment to determine whether at least one deployed application module has no parts executing in the heap;

based on determining that at least one deployed application module has no parts executing in the heap, adapting the module manifests so that the determined at least one deployed application module with no parts executing in the heap will not be deployed as part of the modular application in future deployments; and wherein adapting the module manifests comprises changing at least one module manifest such that parts determined as not executing in the runtime environment are no longer listed in the at least one module manifest.

6. The system of claim 5, wherein adapting the module manifests comprises creating an overlay file that operates on the module manifests so that the at least one determined module will not be deployed in future deployments.

7. The system of claim 5, wherein the module manifests for the modular application are collected and updated in a remote repository.

8. The system of claim 5, wherein the method performed further comprises providing an indication of a characteristic of the determined at least one deployed application module that would allow environment gains to be determined.

9. The system of claim 5, wherein the system is a standalone system or a plugin for a tool, or a plugin for an integrated development environment.

10. A computer program product for optimizing deployment of a modular application in a runtime environment, the computer program product comprising:

a computer readable storage medium having program instructions embodied therewith, the program instructions being executable by a processor to cause the processor to perform a method comprising:

deploying application modules of the modular application, each application module having a module manifest and at least one application module having parts for execution, one or more module manifests comprising one or more references to parts of another application module, and parts required for execution of the application, the deploying being according to the module manifest;

executing the modular application in a runtime environment on a representative workload;

based on the modular application operating on the representative workload, determining that at least one deployed application module has no parts executing in the runtime environment, the determining including checking a heap of the runtime environment to determine whether at least one deployed application module has no parts executing in the heap;

based on determining that at least one deployed application module has no parts executing in the heap, adapting the module manifests so that the determined at least one deployed application module with no parts executing in the heap will not be deployed as part of the modular application in future deployments; and wherein adapting the module manifests comprises changing at least one module manifest such that parts determined as not executing in the runtime environment are no longer listed in the at least one module manifest.

* * * * *